(12) United States Patent
Lee

(10) Patent No.: US 8,798,642 B2
(45) Date of Patent: *Aug. 5, 2014

(54) LOCATION-BASED AND GROUP-BASED OPERATIONS ON A DATA PROCESSING DEVICE

(71) Applicant: Microsoft Corporation, Redmond, WA (US)

(72) Inventor: Chunkwok Lee, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,884

(22) Filed: Jan. 10, 2013

(65) Prior Publication Data
US 2013/0122875 A1 May 16, 2013

Related U.S. Application Data

(63) Continuation of application No. 12/186,375, filed on Aug. 5, 2008, now Pat. No. 8,355,738.

(51) Int. Cl.
*H04W 24/00* (2009.01)
*H04M 3/42* (2006.01)

(52) U.S. Cl.
USPC .................. 455/456.1; 455/456.3; 455/414.1

(58) Field of Classification Search
USPC ............. 455/456.1, 456.3, 456.5, 456.6, 457, 455/458–459, 418–420, 517–519
See application file for complete search history.

(56) References Cited

U.S. PATENT DOCUMENTS

| | | | |
|---|---|---|---|
| 6,542,750 B2 | 4/2003 | Hendrey et al. | |
| 6,553,236 B1 | 4/2003 | Dunko et al. | |
| 6,968,179 B1 | 11/2005 | De Vries | |
| 6,975,873 B1 | 12/2005 | Banks et al. | |
| 6,999,783 B2 | 2/2006 | Toyryla et al. | |
| 7,142,839 B2 | 11/2006 | Pelaez et al. | |
| 7,162,202 B2 * | 1/2007 | Westman | 455/41.2 |
| 7,392,042 B2 | 6/2008 | Bates et al. | |
| 7,418,268 B1 | 8/2008 | Cabano et al. | |
| 7,529,558 B1 | 5/2009 | Blair et al. | |
| 7,539,505 B2 | 5/2009 | Wajda et al. | |
| 7,668,537 B2 | 2/2010 | De Vries | |
| 7,801,542 B1 | 9/2010 | Stewart | |
| 7,945,272 B2 | 5/2011 | Kim | |

(Continued)

OTHER PUBLICATIONS

"Notice of Allowance", U.S. Appl. No. 12/186,375, (Sep. 6, 2012), 6 pages.

(Continued)

*Primary Examiner* — Brandon Miller
(74) *Attorney, Agent, or Firm* — Sung Kim; Andrew Sanders; Micky Minhas

(57) ABSTRACT

A system and method are described for location-based and group-based operations on a data processing device. For example, a computer-implemented method according to one embodiment of the invention comprises: establishing a group containing identities of a plurality of users within the group and notification data indicating when other users are to be notified about current locations of the users in the group; determining whether wireless data processing devices of two or more users of the group are at the same location or within a particular distance of the location; identifying the users and the location; and notifying other users in the group of the identity of the users and the location.

20 Claims, 4 Drawing Sheets

(56) References Cited

U.S. PATENT DOCUMENTS

| | | | |
|---|---|---|---|
| 7,983,714 B2 * | 7/2011 | Zhang | 455/557 |
| 8,000,724 B1 * | 8/2011 | Rayburn et al. | 455/456.3 |
| 8,014,806 B2 | 9/2011 | Mock et al. | |
| 8,355,738 B1 * | 1/2013 | Lee | 455/456.1 |
| 2004/0259581 A1 | 12/2004 | Crisler et al. | |
| 2005/0143097 A1 * | 6/2005 | Wilson et al. | 455/456.3 |
| 2005/0221807 A1 | 10/2005 | Karlsson et al. | |
| 2008/0227473 A1 | 9/2008 | Haney | |
| 2010/0015991 A1 | 1/2010 | Evans et al. | |
| 2010/0029302 A1 | 2/2010 | Lee et al. | |
| 2010/0151842 A1 | 6/2010 | De Vries | |
| 2010/0227594 A1 | 9/2010 | De Vries | |

OTHER PUBLICATIONS

"Non-Final Office Action", U.S. Appl. No. 12/186,375, (May 4, 2012), 13 pages.

"Final Office Action", U.S. Appl. No. 12/186,375, (Jan. 11, 2012), 13 pages.

"Non-Final Office Action", U.S. Appl. No. 12/186,375, (Feb. 3, 2011), 10 pages.

* cited by examiner

LOCATION-BASED AND GROUP-BASED OPERATIONS ON A DATA PROCESSING DEVICE

RELATED APPLICATION

This application is a continuation of and claims priority under 35 U.S.C. §120 to U.S. patent application Ser. No. 12/186,375, filed on Aug. 5, 2008, the disclosure of which is incorporated by reference herein in its entirety.

TECHNICAL FIELD

This application relates generally to the field of wireless data processing systems and more particularly to location-based and group-based operations on a data processing device.

BACKGROUND

The use of wireless devices has become an increasing part of everyday life. Wireless devices have become popular due to their portability, convenience and ease of use. Today, wireless devices offer a myriad of functions including telephony functions, location-based services, email, multimedia playback, and electronic calendaring, to name a few. Integrated circuit technology has allowed for the miniaturization of circuits into smaller and smaller form factors; allowing for additional functionality and services to become available on wireless devices. Additionally, decreasing memory sizes have permitted wireless devices to store more larger amounts of information. As a result, wireless networks are rapidly expanding bandwidth and services to accommodate this increase in wireless information and functionality.

Many wireless devices today include Global Positioning System (GPS) capabilities or other location-based capabilities. A GPS receiver within a GPS-enabled wireless device can determine the device's precise location, speed, and direction by reading precise microwave signals transmitted from a constellation of Medium Earth Orbit satellites. This information may be used for a variety of applications including, for example, mapping programs.

SUMMARY

A system and method are described for location-based and group-based operations on a data processing device. For example, a computer-implemented method according to one embodiment of the invention comprises: establishing a group containing identities of a plurality of users within the group and notification data indicating when other users are to be notified about current locations of the users in the group; determining whether wireless data processing devices of two or more users of the group are at the same location or within a particular distance of the location; identifying the users and the location; and notifying other users in the group of the identity of the users and the location.

BRIEF DESCRIPTION OF THE DRAWINGS

A better understanding of location-based and group-based operations on a data processing device can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
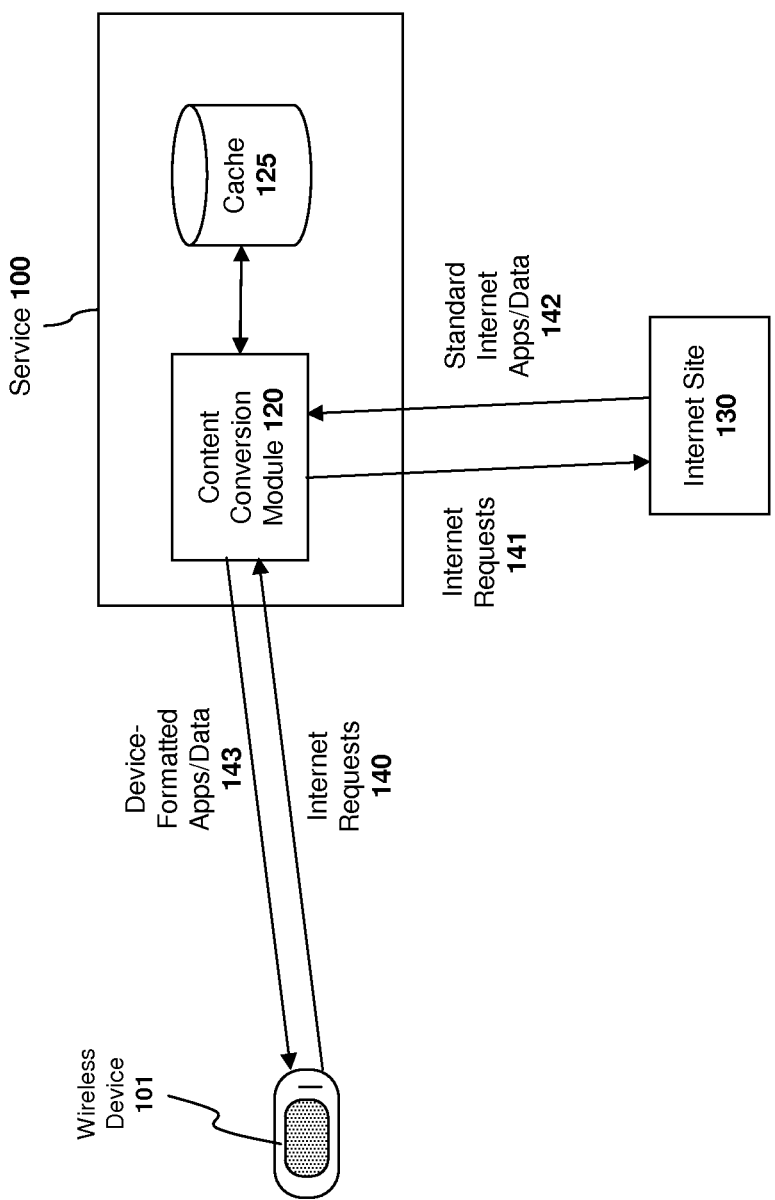
FIG. 1 illustrates a system that includes a service communicating with a data processing device.

Embodiments of the invention may be implemented on a wireless device 101 which communicates with a data processing service 100 as illustrated generally in FIG. 1. Embodiments of a service 100 and data processing device 101 are described, for example, in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 will now be described followed by a detailed description of a system and method for location-based and group-based wireless device operations. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 101 can properly interpret. Thus, as illustrated in FIG. 1, one embodiment of the service 100 includes content conversion logic 120 for processing requests for Internet content 140. More particularly, the service 100 acts as a proxy for the data processing device 101, forwarding Internet requests 140, 141 to the appropriate Internet site 130 on behalf of the data processing device 101, receiving responses from the Internet site 130 in a standard Internet format (e.g., Web pages with embedded audio/video and graphical content, e-mail messages with attachments, . . . etc), and converting the standard Internet responses 124 into a format which the data processing device 101 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 101. As described above, in one embodiment, the bytecodes may be Java bytecodes/applets. However, the conversion logic 120 may generate various other types of interpreted and/or non-interpreted code, depending on the particular type of data processing device 101 being used (e.g., one with an interpreter module or one without).

Because one embodiment of the service 100 maintains an intimate knowledge of the capabilities and/or configurations of each data processing device 101 (e.g., screen size, graphics/audio capabilities, available memory, processing power, user preferences, . . . etc) it can reconstruct the requested Internet content accurately, while at the same time minimizing the bandwidth required to transmit the content to the device 101. For example, the conversion logic 120 may perform pre-scaling and color depth adjustments to the requested content so that it will be rendered properly within the data processing device's 101's display. In making these calculations, the conversion may factor in the memory and processing power available on the data processing device 101. In addition, the conversion logic 120 may compress the requested content using a variety of compression techniques, and thereby preserve network bandwidth.

System and Method for Location-Based and Group Based Operations on a Wireless Device One embodiment of the invention employs location tracking techniques to track each wireless data processing device and to identify when certain groups of wireless devices are at (or near) the same location. Some of the location tracking techniques used within the context of the present invention are described in the co-pending application entitled System and Method for Providing Location Based Services for Wireless Communication Devices, filed Dec. 8, 2009, Ser. No. 12/633,440, which is assigned to the assignee of the present application and which is incorporated herein by reference. By way of example, and not limitation, the service 100 may track the location of each data processing device 101 by using global positioning system (GPS) tracking techniques (i.e., for those devices equipped with GPS capabilities). In addition, the service 100 may track that do not have GPS capabilities and/or devices which are not currently receiving a GPS signal based on the identification of the current cell tower to which each device is connected. There are many technologies capable of tracking location which may be employed while still complying with the underlying principles of the invention including AGPS, cell-tower or Wifi triangulation, user self-reporting, and various other services (e.g. Yahoo's Fireeagle service). The underlying principles of the invention remain the same regardless of how the service 100 tracks the location of each of the wireless data processing devices.

Figure 2:
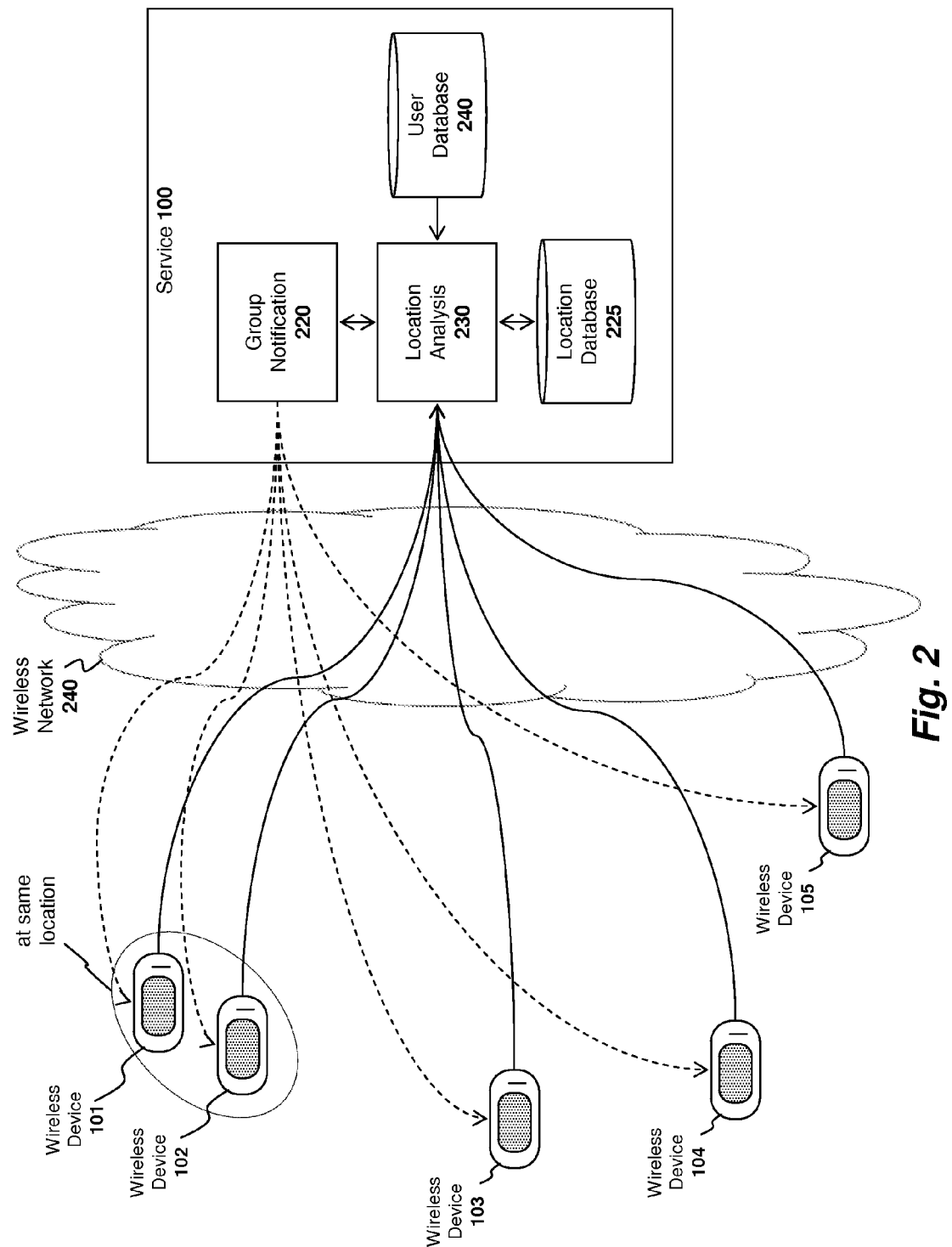
FIG. 2 illustrates a system architecture according to one embodiment of the invention.
Figure 3:
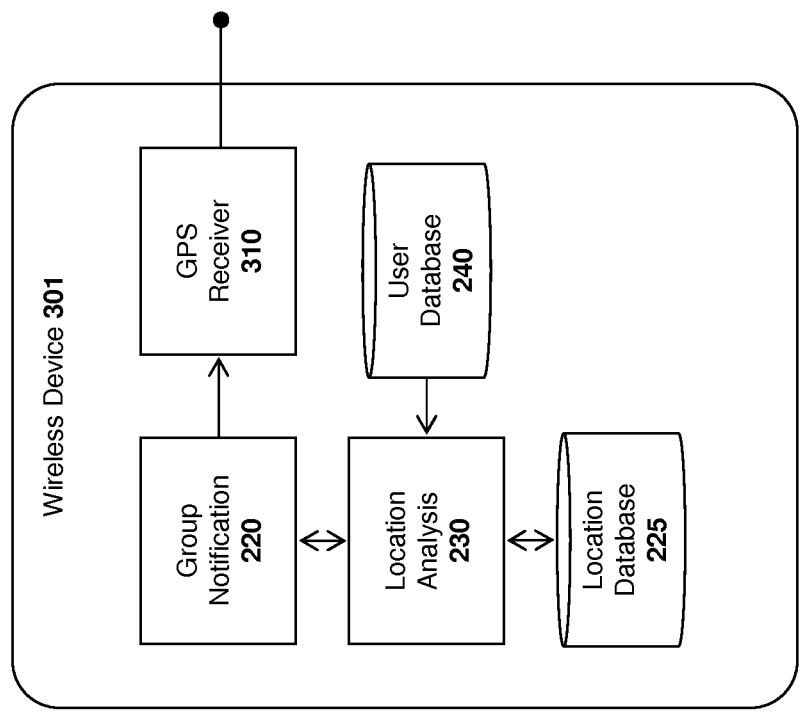
FIG. 3 illustrates a wireless device architecture according to one embodiment of the invention.

FIG. 2 illustrates a service-based system for tracking wireless data processing devices 101-105 in accordance with one embodiment of the invention. FIG. 3 illustrates a stand-alone wireless device 301 utilizing the same (or similar) functionality as the service-based system of FIG. 2. While much of the following discussion will focus on the system shown in FIG. 2, the same basic functionality may also be implemented within the stand-alone wireless device 301 shown in FIG. 3.

As illustrated in FIG. 2, this embodiment of the invention includes a location analysis module 230 for analyzing current user/wireless device activity for a specified group of wireless devices 101-105 and responsively updating a group notification module 220 to notify members of the group of certain specified activities. This embodiment of the invention also includes a location database 225 for storing known locations such as shopping malls, restaurants, gas stations and other points of interest. The location database 225 associates each of these known locations with location data (e.g., GPS data) provided by the wireless devices 101-105 (e.g., to notify the user of nearby points of interest and/or display the points of interest on a map). In addition, this embodiment includes a user database 240 for storing user data such as buddy lists, other contact groups and user-specific locations such as a user's home and work locations and/or other places frequented by the user. The user database 240 may also include the user's calendar, contacts list, email, and any other types of user data maintained by the service 100.

In one embodiment, users of the wireless data processing devices 101-105 are part of a location-based "buddy group" maintained within the user database 240 on the service 100. Various different types of buddy groups may be maintained on the user database 240. For example, a user may create a buddy group for work friends and college friends and invite other users to join. In addition, certain groups may be open to all users while others may be private (i.e., made visible to a select set of invited users). For the purpose of the following discussion, it will be assumed that all users are part of a particular buddy group. In one embodiment, the service 100 establishes buddy groups dynamically based on the contents of each of the user's wireless devices 101-105. For example, if each of the 5 users of the wireless devices 101-105 include each of the other users on their buddy list for instant messaging (or other application types) then the service may incorporate all of the users into a buddy group.

Regardless of how the buddy group is established and maintained, in one embodiment of the invention, members of the group are notified about location-based events with respect to other members of the group. For example, in one embodiment, the location analysis module 230 detects when two or more users within the group are at the same location (or within a specified distance from one another). In this event, the location analysis module 230 attempts to determine the location and provides this information to the group notification module 220. For example, if two users are detected together at a restaurant, the location analysis module 230 determines the name of the restaurant from the location database 225 and provides this information along with the identity of the users to the group notification module 220. The group notification module 220 then transmits a notification of the meeting (i.e., the location and the identity of the users) to the other users in the group. Consequently, other users in the group will have the option of contacting the other users and/or meeting them at the restaurant.

In addition, in one embodiment, when two or more users of a group are together at a location, one embodiment of the wireless devices 101-105 generates a unique visual and/or audible notification. For example, when two or more users are at the same location, an LED on the wireless device may periodically flash in a special manner (e.g., a specific color or set of colors, a particular flash pattern or frequency, etc), thereby providing a visual notification that members within the group are together. As new members of the group arrive at the location, the members' devices will begin generating the unique visual and/or audible notification.

In one embodiment, each user may specify parameters defining when other users within the group who should be permitted to receive a notification containing the user's location. For example, the user may specify a set of users from the group who should not receive notifications and/or particular times of the day or days of the week when the other users should not receive notifications (e.g., during the weekends or evenings during the week). Users may disable the notifications at any time by sending a disable command to the location analysis module 230 on the service 100.

The wireless devices 101-105 illustrated in FIGS. 1 and 2 may include one or more transceivers (not shown) for communicating over wireless networks. Both the wireless devices 101-105 and the service 100 may include one or more memories (not shown) for storing program code and data and one or more processors (not shown) for processing the program code and data to perform the operations described herein. Thus, in one embodiment, the location analysis module 230 and group notification module 220 are implemented as program code executed by a general purpose or special purpose processor. Alternatively, these modules may be implemented as hardware or may be implemented as any suitable combination of hardware and software while still complying with the underlying principles of the invention.

As mentioned above, FIG. 3 illustrates one particular embodiment of the invention implemented on a stand-alone wireless device 301. In this embodiment, the wireless device 301 includes a local location analysis module 230 and group notification module 220 to transmit notifications to other wireless devices via a GPS receiver 310 using the techniques described above. In addition, the wireless device 301 includes a local copy of a location database 225 and user database 240 which store the same types of location data and user data, respectively, as described above.

Figure 4:
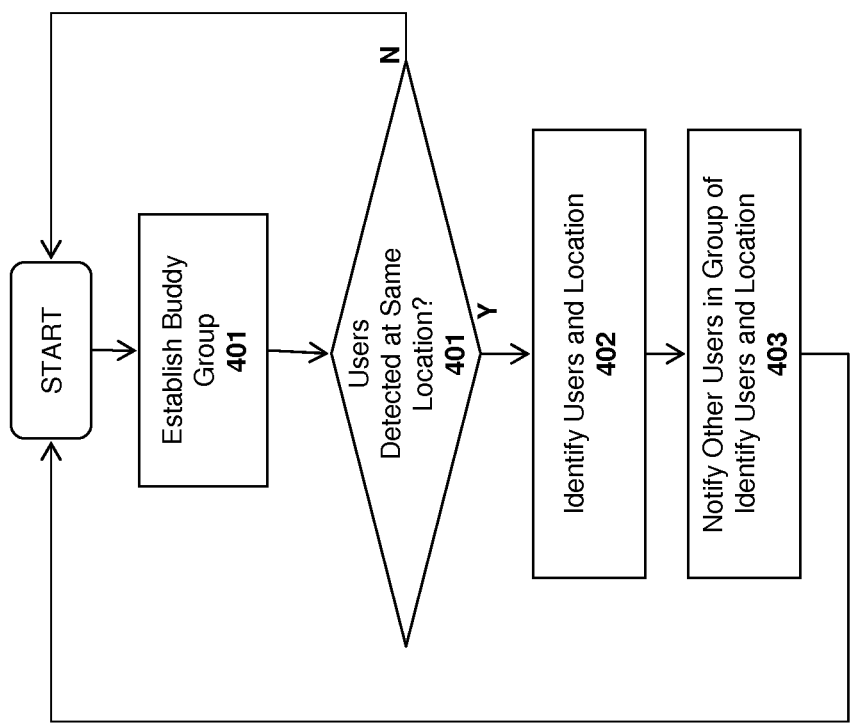
FIG. 4 illustrates a method according to one embodiment of the invention.

FIG. 4 illustrates one embodiment of a method which incorporates the foregoing techniques. At 401 a buddy group is established using one or more of the techniques described above (e.g., manually by a user or automatically by the service). A determination is made at step 401 as to whether any users in the group are at the same location. If not, then the process loops back. If so, then at step 402, the location is identified as are the users at that location. For example, if two users are at a sporting event, then the name of the sporting event location is identified (e.g., "Yankee Stadium") as well as the identity of the users. Finally, at step 403, other users in the group are notified of the location and the identity of the users at the location.

In one embodiment, certain locations may be excluded from the notification process. For example, if two of the users within the group work together, then notifications would be sent each work day, resulting in unnecessary data traffic. Various other types of exclusions may be stored within the user data for each group.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machne-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

For example, although the embodiments described above are limited to a wireless implementation, the underlying principles of the invention may be employed in a variety of different types of networks. Similarly, while the protocol stack described above is implemented using Java, the underlying principles of the invention are not limited to any particular programming language.

Accordingly, the scope and spirit of the invention should be judged in terms of the claims which follow.

What is claimed is:

1. A wireless device comprising:
at least a memory and a processor configured to:
maintain a buddy list of friends of a user;
dynamically establish a group containing identities of users in the group, the group dynamically established based on the buddy list and based on additional buddy lists from each user in the group, each of the additional buddy lists corresponding to a respective user and including each of the users in the group, other than the respective user, in the buddy list.

2. The wireless device of claim 1, wherein the group includes at least two of the friends of the user.

3. The wireless device of claim 1, wherein the group includes some but not all of the friends of the user in the buddy list.

4. The wireless device of claim 1, wherein the buddy list comprises an instant messaging buddy list.

5. The wireless device of claim 1, wherein the memory and the processor are further configured to:
determine whether the wireless device, and at least one additional wireless device corresponding to an additional user of the users in the group, are at a same location;
identify the user, the additional user, and the same location; and
notify the user and the additional user that the user and the additional user are at the same location.

6. The wireless device of claim 5, wherein the memory and the processor are further configured to notify each of the users in the group that the user and the additional user are at the same location.

7. The wireless device of claim 5, wherein the memory and the processor are configured to determine whether the wireless device, and the at least one additional wireless device corresponding to the additional user, are at the same location by:
receiving location data from the wireless device;
receiving additional location data from the at least one additional wireless processing device; and
comparing the location data to the additional location data to determine whether the wireless device and the additional wireless processing device are at the same location.

8. The wireless device of claim 7 wherein the location data and the additional location data comprises global positioning system (GPS) data or cell tower identification data.

9. The wireless device of claim 5, wherein the memory and the processor are configured to notify the user and the additional user by providing a specified visual or audible notification.

10. The wireless device of claim 5, wherein the memory and the processor are configured to notify the user by causing a light-emitting diode (LED) on the wireless device to flash.

11. A method comprising:
maintain a buddy list of friends of a user;
dynamically establish a group containing identities of users in the group, the group dynamically established based on the buddy list and based on additional buddy lists from each user in the group, each of the additional buddy lists corresponding to a respective user and including each of the users in the group, other than the respective user, in the buddy list;

determining whether wireless devices corresponding to two or more of the users in the group are at a same location;

identifying the two or more users and the same location; and notifying the two or more users that the two or more users are at the same location.

12. The method of claim 11, further comprising notifying each of the users in the group that the two or more users are at the same location.

13. The method of claim 11, wherein the notifying further comprises notifying the two or more users by providing a specified visual or audible notification.

14. The method of claim 11, wherein the notifying further comprises notifying the two or more users by causing a light-emitting diode (LED) on each of the wireless devices corresponding to each of the two or more users to flash.

15. The method of claim 11, further comprising:
prior to the notifying, determining whether parameters defined by each of the two or more users indicate that the two or more users should be notified; and
notifying the two or more users if the parameters indicate that the two or more users should be notified, or disabling the notification if the parameters indicate that the two or more users should not be notified.

16. A method comprising:
maintaining a buddy list of friends of a user; and
dynamically establishing a group containing identities of users in the group, the group dynamically established based on the buddy list and based on additional buddy lists, each of the additional buddy lists corresponding to a respective user and including each of the users in the group, other than the respective user, in the buddy list.

17. The method of claim 16, wherein the method is implemented at a wireless device of the user.

18. The method of claim 16, wherein the method is implemented at a server.

19. The method of claim 16, wherein the group includes at least two of the friends of the user.

20. The method of claim 16, wherein the group includes some but not all of the friends of the user in the buddy list.

* * * * *